US006808278B1

(12) United States Patent
Jirnov

(10) Patent No.: US 6,808,278 B1
(45) Date of Patent: Oct. 26, 2004

(54) MIRROR DEVICE FOR A CAP

(76) Inventor: Andrei A. Jirnov, 8905 Fair Oaks Blvd. Unit F, Carmichael, CA (US) 95608

( * ) Notice: Subject to any disclaimer, the term of this patent is extended or adjusted under 35 U.S.C. 154(b) by 263 days.

(21) Appl. No.: 10/127,773

(22) Filed: Apr. 23, 2002

(51) Int. Cl.[7] .............................. G02B 7/182; A42B 1/24
(52) U.S. Cl. ...................... 359/879; 359/872; 2/209.13; 2/209.14
(58) Field of Search ................................ 359/879, 838, 359/871, 972; 2/209.13, 209.14, DIG. 8; D2/866; D12/188

(56) References Cited

U.S. PATENT DOCUMENTS

| 582,724 A | * | 5/1897 | Dromgoole | ................. 248/479 |
| 736,418 A | * | 8/1903 | Merrick | ...................... 2/209.14 |
| 4,307,885 A | * | 12/1981 | Pidcock | ...................... 473/210 |

FOREIGN PATENT DOCUMENTS

| JP | 08-038667 A | * | 2/1996 |
| JP | 2000-009450 A | * | 1/2000 |
| WO | WO 91/01509 A1 | * | 2/1991 |

* cited by examiner

Primary Examiner—John Juba, Jr.

(57) ABSTRACT

A mirror device for a cap for allowing the user to see behind oneself and to either side which is especially useful when the user is riding a bicycle. The mirror device for a cap includes a first panel member having a back side and a front side and being adapted to be securely and pivotally disposed on an underside of a bill of a cap; and also includes a support assembly for supporting the first panel member upon the underside of the bill of the cap; and further includes a second panel member being hingedly attached to the first panel member and having a front side and a back side; and also includes a mirror being attached to the second panel member; and further includes an assembly for hingedly attaching the first and second panel members together. The support assembly allows the user to swivel the mirror left and right which allows the user to view behind oneself and to either side of oneself.

2 Claims, 2 Drawing Sheets

MIRROR DEVICE FOR A CAP

BACKGROUND OF THE INVENTION

1. Field of the Invention

The present invention relates to cap-mounted mirrors and more particularly pertains to a new mirror device for a cap for allowing the user to see behind oneself and to either side which is especially useful when the user is riding a bicycle.

2. Description of the Prior Art

The use of cap-mounted mirrors is known in the prior art. More specifically, cap-mounted mirrors heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,884,337; U.S. Pat. No. 1,358,551; U.S. Pat. No. 4,490,012; U.S. Pat. No. 5,076,701; U.S. Pat. No. Des. 378,159; and U.S. Pat. No. 3,988,058.

While these devices fulfill their respective, particular objectives and requirements, the aforementioned patents do not disclose a new mirror device for a cap. The prior art has mirror attaches to the bills of hats, but the mirrors are generally stationary and cannot be swiveled back and forth as desired by the user unlike the present invention.

SUMMARY OF THE INVENTION

The general purpose of the present invention, which will be described subsequently in greater detail, is to provide a new mirror device for a cap which has many of the advantages of the cap-mounted mirrors mentioned heretofore and many novel features that result in a new mirror device for a cap which is not anticipated, rendered obvious, suggested, or even implied by any of the prior art cap-mounted mirrors, either alone or in any combination thereof. The present invention includes a first panel member having a back side and a front side and being adapted to be securely and pivotally disposed on an underside of a bill of a cap; and also includes a support assembly for supporting the first panel member upon the underside of the bill of the cap; and further includes a second panel member being hingedly attached to the first panel member and having a front side and a back side; and also includes a mirror being attached to the second panel member; and further includes an assembly for hingedly attaching the first and second panel members together. The support assembly allows the user to swivel the mirror left and right which allows the user to view behind oneself and to either side of oneself.

There has thus been outlined, rather broadly, the more important features of the mirror device for a cap in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new mirror device for a cap which has many of the advantages of the cap-mounted mirrors mentioned heretofore and many novel features that result in a new mirror device for a cap which is not anticipated, rendered obvious, suggested, or even implied by any of the prior art cap-mounted mirrors, either alone or in any combination thereof.

Still another object of the present invention is to provide a new mirror device for a cap for allowing the user to see behind oneself and to either side which is especially useful when the user is riding a bicycle.

Still yet another object of the present invention is to provide a new mirror device for a cap that is easy and convenient to use.

Even still another object of the present invention is to provide a new mirror device for a cap that increases safety for the user because it allows the user to see what's behind him without having to actually turn around to look.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
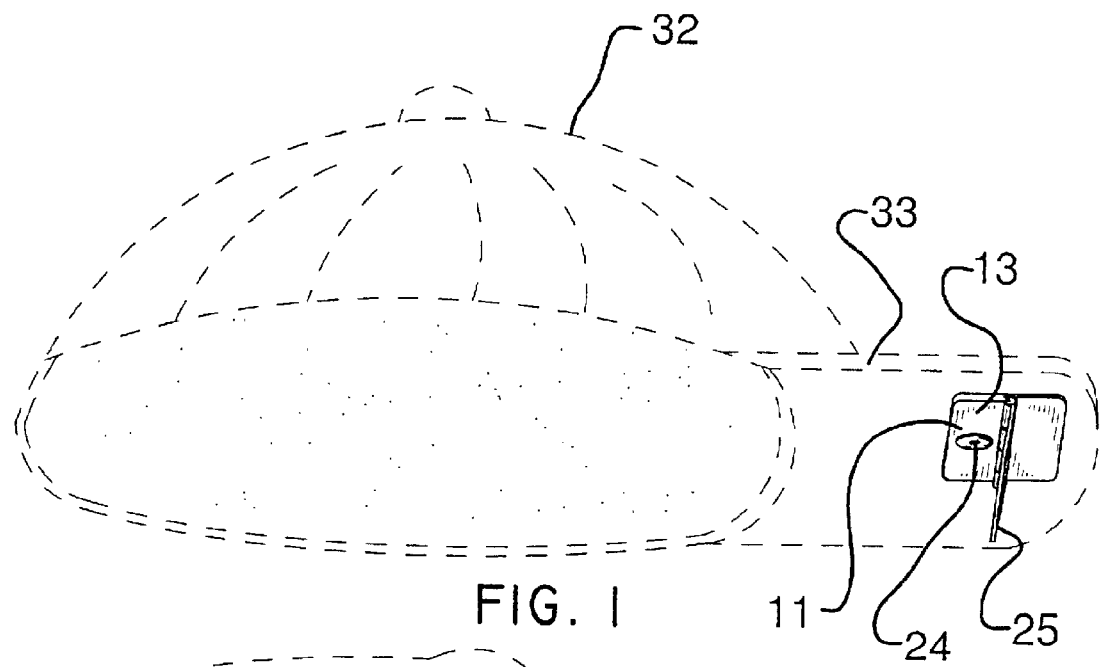
FIG. 1 is a perspective view of a new mirror device for a cap according to the present invention and shown in use.
Figure 2:
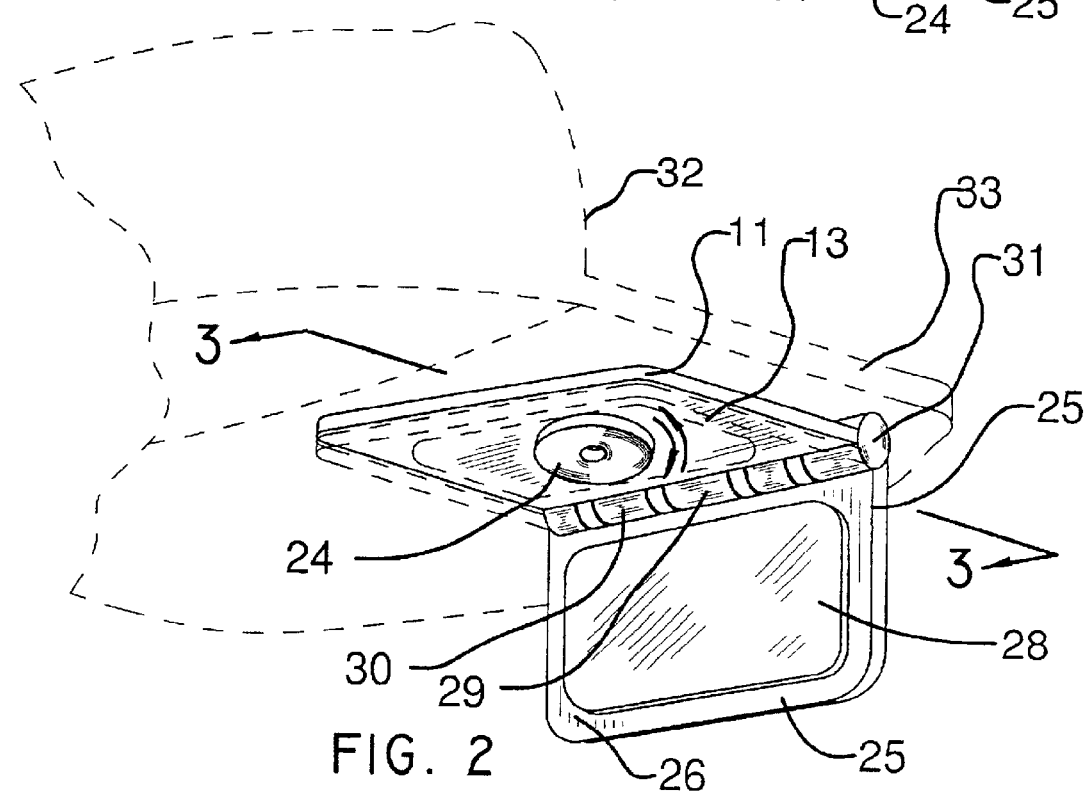
FIG. 2 is a detailed perspective view of the present invention.
Figure 3:
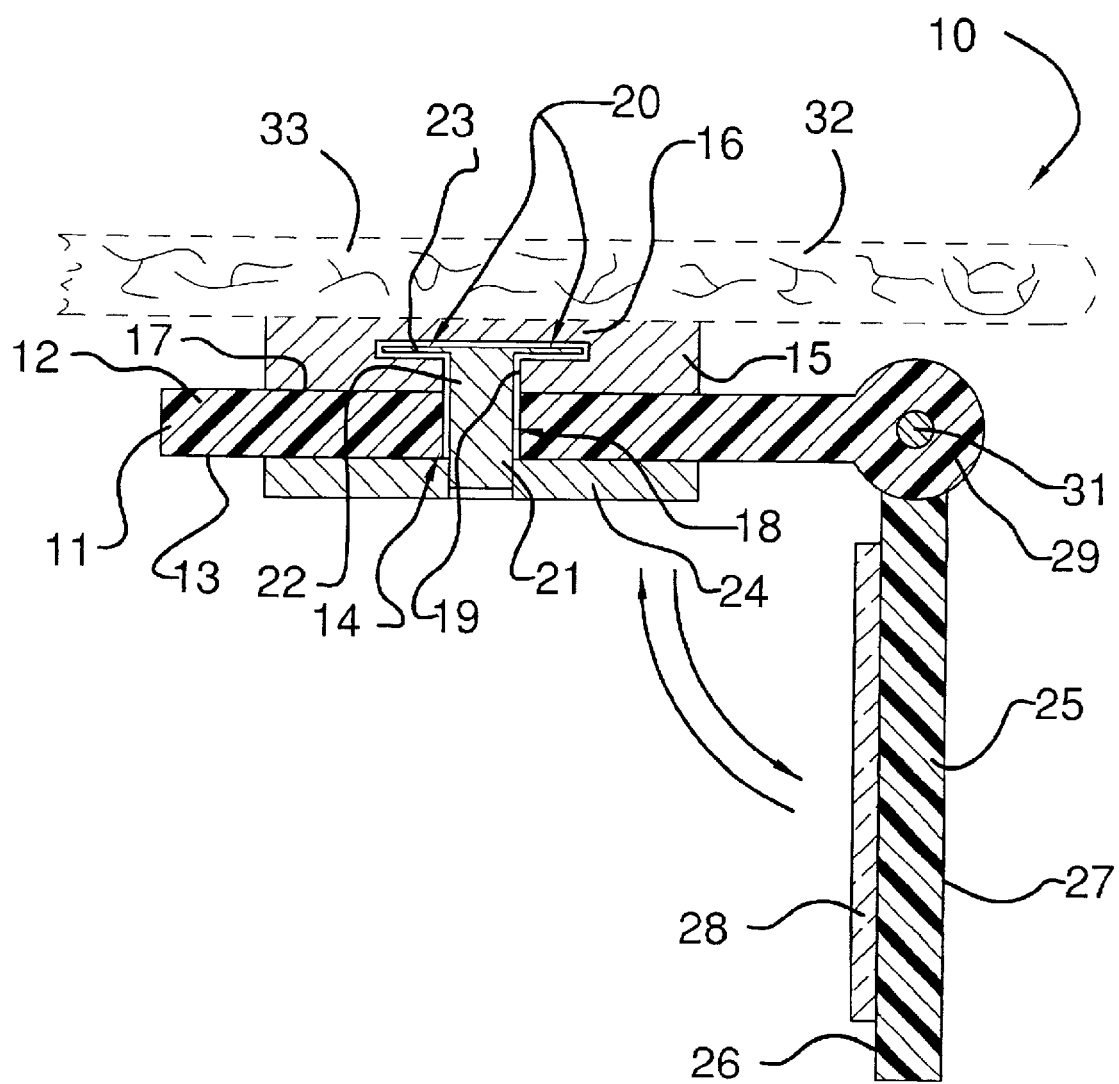
FIG. 3 is a cross-sectional view of the present invention.

With reference now to the drawings, and in particular to FIGS. 1 through 3 thereof, a new mirror device for a cap embodying the principles and concepts of the present invention and generally designated by the reference numeral 10 will be described.

As best illustrated in FIGS. 1 through 3, the mirror device for a cap 10 generally comprises a first panel member 11 having a back side 12 and a front side 13 and being adapted to be securely and pivotally disposed on an underside of a bill 33 of a cap 32. The back side 12 of the first panel member 11 is disposed generally parallel to the bill 33 of the cap 32. The first panel member 11 has a hole 14 being extended through a central portion of the first panel member 11. A support assembly for supporting the first panel member 11 upon the underside of the bill 33 of the cap 32 includes a support member 15 being adapted to be securely and conventionally attached to the underside of the bill 33 of the cap 32, and also includes a pivot member 21 being pivotally and conventionally attached to the support member 15 and being rotatably extended through the hole 14 of the first panel member 11 to effectively suspend the first panel member 11 from the bill 33 of the cap 32. The support member 15 has a back side 16 which is securely and conventionally attached to the bill 33 of the cap 32 and also has a front side 17 which has a slot 18 disposed therein. The slot 18 of the support member 15 is defined by a wall 19 having an annular channel 20 being disposed therein thus forming a generally T-shape. The pivot member 21 includes a shaft member 22 rotatably extending through the hole 14 of the first panel member 11 and into the slot 18 of the support member 15, and also includes an annular flange member 23 being conventionally attached and welded to a first end of the shaft member 22 and being pivotally disposed in the annular channel 20 of the support member 15, and further includes a disc-shaped retainer/knob member 24 being conventionally attached and welded at a second end of the shaft member 22 for retaining the first panel member 11 to the underside of the bill 33 of the cap 32. The disc-shaped retainer/knob member 24 is engaged about an edge of the hole 14 and upon the front side 13 of the first panel member 11 for pivoting the first panel member 11 about an axis of the hole 14 of the first panel member 11.

A second panel member 25 is hingedly attached to the first panel member 11 and has a front side 26 and a back side 27. The second panel member 25 is foldable upon the first panel member 11 and is dependable generally perpendicular to the bill 33 of the cap 32. A mirror 28 is conventionally attached to the second panel member 25. The mirror 28 is securely and conventionally attached to the front side 26 of the second panel member 25 and can be viewed into by a wearer of the cap 32 upon the second panel member 25 being depended generally perpendicular to the bill 33 of the cap 32 such that the wearer of the cap 33 can view what's behind oneself and to either side.

A means for hingedly attaching the first and second panel members 11,25 together includes a plurality of first tubular members 29 being spacedly and conventionally attached in registration along an end wall of either one of the first and second panel members 11,25, and also includes a plurality of second tubular members 30 being spacedly and conventionally attached in registration along an end wall of the other of the first and second panel members 11,25 and being aligned with the first tubular members 29, and further includes a bolt-like member 31 being extended through the first and second tubular members 29,30 for the securing thereof with the first and second tubular members 29,30 being pivotable about the bolt-like member 31.

In use, the user would place the cap 32 on one's head with the bill 33 being disposed generally forward of one's face. The user would depend the second panel member 25 downwardly from the bill 33 of the cap 32 and would selectively position the mirror 28 by turning the disc-shaped retainer/knob member 24 so that the mirror can be angled to either the left or right enabling the user to view objects either directly behind oneself or to either side of oneself while walking, riding a bicycle or a motorcycle. If not needed, the second panel member 25 can be folded upwardly into engagement with the first panel member 11.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the mirror device for a cap. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A mirror device for a cap comprising:

a first panel member having a back side and a front side and being securely and pivotally disposed on an underside of a bill of a cap, said back side of said first panel member being disposed generally parallel to the bill of the cap, said first panel member having a hole being extended through a central portion of said first panel member;

a support assembly for supporting said first panel member upon the underside of the bill of the cap, said support assembly including a support member being securely attached to the underside of the bill of the cap, and also including a pivot member being pivotally attached to said support member and being extended through said hole of said first panel member to effectively suspend said first panel member from the bill of the cap;

a second panel member being hingedly attached to said first panel member and having a front side and a back side;

a mirror being attached to said second panel member; and a means for hingedly attaching said first and second panel members together;

wherein said support member has a back side which is securely attached to the bill of the cap and also has a front side which has a slot disposed therein;

wherein said slot of said support member is defined by a wall having an annular channel disposed therein thus forming a generally T-shape.

2. A mirror device for a cap as described in claim 1, wherein said pivot member includes a shaft member extending through said hole of said first panel member and into said slot of said support member, and also includes an annular flange member being attached to a first end of said shaft member and being pivotally disposed in said annular channel of said support member, and further includes a disc-shaped retainer/knob member being attached at a second end of said shaft member for retaining said first panel member to the underside of the bill of the cap, said disc-shaped retainer/knob member being engaged about an edge of said hole and upon said front side of said first panel member for pivoting said first panel member about an axis of said hole of said first panel member.

* * * * *